US008416187B2

(12) United States Patent
Margolis et al.

(10) Patent No.: US 8,416,187 B2
(45) Date of Patent: Apr. 9, 2013

(54) ITEM NAVIGATION USING MOTION-CAPTURE DATA

(75) Inventors: Jeffrey Margolis, Seattle, WA (US); Tricia Lee, Kirkland, WA (US); Gregory A. Martinez, Seattle, WA (US); Alex Aben-Athar Kipman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 12/820,990

(22) Filed: Jun. 22, 2010

(65) Prior Publication Data
US 2011/0310007 A1    Dec. 22, 2011

(51) Int. Cl.
*G09G 5/08*   (2006.01)
(52) U.S. Cl.
USPC .............. 345/157; 348/77; 348/135; 715/830
(58) Field of Classification Search .................. None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |

(Continued)

FOREIGN PATENT DOCUMENTS

| | | |
|---|---|---|
| CN | 101729808 A | 6/2010 |
| CN | 201254344 B | 6/2010 |

(Continued)

OTHER PUBLICATIONS

Frens, Johannes W., "Designing for Rich Interaction: Integrating Form, Interaction, and Function", Retrieved at <<http://alexandria.tue.nl/extra2/200610381.pdf>>, 2006, pp. 225.

(Continued)

*Primary Examiner* — Jason Olson
(74) *Attorney, Agent, or Firm* — Alleman Hall McCoy Russell & Tuttle LLP

(57) ABSTRACT

A system and method is provided for using motion-capture data to control navigating of a cursor in a user interface of a computing system. Movement of a user's hand or other object in a three-dimensional capture space is tracked and represented in the computing system as motion-capture model data. The method includes obtaining a plurality of positions for the object from the motion-capture model data. The method determines a curved-gesture center point based on at least some of the plurality of positions for the object. Using the curved-gesture center point as an origin, an angular property is determined for one of the plurality of positions for the object. The method further includes navigating the cursor in a sequential arrangement of selectable items based on the angular property.

20 Claims, 4 Drawing Sheets

U.S. PATENT DOCUMENTS

| | | | |
|---|---|---|---|
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |

| | | | |
|---|---|---|---|
| 8,035,614 | B2 | 10/2011 | Bell et al. |
| 8,035,624 | B2 | 10/2011 | Bell et al. |
| 8,072,470 | B2 | 12/2011 | Marks |
| 8,237,655 | B2* | 8/2012 | Yabe et al. ............ 345/157 |
| 2004/0161132 | A1 | 8/2004 | Cohen et al. |
| 2006/0262116 | A1 | 11/2006 | Moshiri et al. |
| 2007/0216661 | A1 | 9/2007 | Chen et al. |
| 2008/0026838 | A1 | 1/2008 | Dunstan et al. |
| 2008/0134078 | A1* | 6/2008 | Han ............ 715/784 |
| 2009/0125824 | A1 | 5/2009 | Andrews et al. |
| 2009/0231553 | A1* | 9/2009 | Tanaka et al. ............ 353/85 |
| 2010/0031202 | A1 | 2/2010 | Morris et al. |
| 2010/0053304 | A1 | 3/2010 | Underkoffler et al. |
| 2010/0138785 | A1 | 6/2010 | Uoi et al. |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Neumann, Andreas., "Navigation in Space, Time and Topic", Retrieved at << http://www.carto.net/neumann/papers/2005 >>, XXII International Cartographic Conference (ICC2005), Jul. 11-16, 2005, pp. 11.

Kim, Ji-Sun., "Tangible User Interface for CAVETM based on Augmented Reality Technique", Retrieved at << http://scholar.lib.vt.edu/theses/available/etd-01062006-185512/unrestricted/Ji-Sun_MSThesis_rev1.pdf >>, Dec. 2005, pp. 132.

"Global and local navigation", Retrieved at << http://www.webdesignoffice.us/designing_a_web_site/global_local_navigation.html >>, Retrieved Date: Apr. 9, 2010, pp. 2.

Wu, Andy., "Tangible Visualization", Retrieved at << http://people.ischool.berkeley.edu/~daniela/tei2010/gsc10a.pdf >>, Tangible and embedded interaction, Proceedings of the fourth international conference on Tangible, embedded and embodied interaction, Jan. 24-27, 2010, pp. 2.

Satanek, Brandon L., "The Effects of Multidimensional Navigational Aids and Individual Differences on WWW Hypertext Navigation", Retrieved at << http://scholar.lib.vt.edu/theses/available/etd-42098-213026/unrestricted/thesis2.PDF >>, May 4, 1998, pp. 119.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, Vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

The State Intellectual Property Office of the People's Republic of China, Notice of the First Office Action of CN201110185119.7, Nov. 21, 2012, China, 10 pages.

* cited by examiner

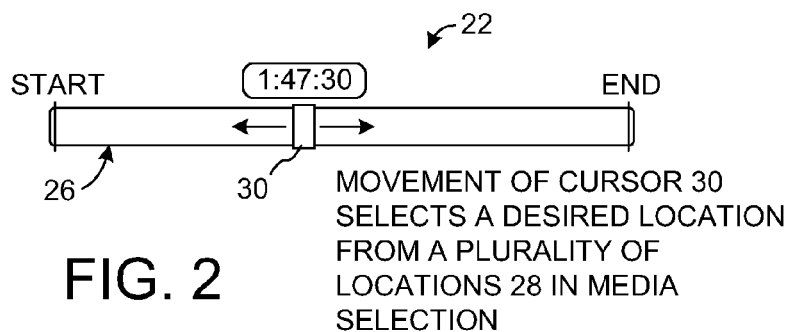

FIG. 2

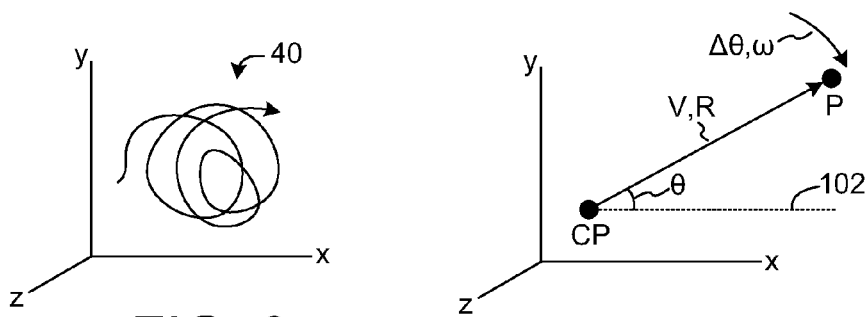

| TIME | POSITION | CENTER POINT | VECTOR | RADIUS | ANGLE | ANGLE CHANGE | ANGULAR VELOCITY |
|---|---|---|---|---|---|---|---|
| $T_1$ | $P_1$ | $CP_1$ | $V_1$ | $R_1$ | $\theta_1$ | $\Delta\theta_1$ | $\omega_1$ |
| $T_2$ | $P_2$ | $CP_2$ | $V_2$ | $R_2$ | $\theta_2$ | $\Delta\theta_2$ | $\omega_2$ |
| $T_3$ | $P_3$ | $CP_3$ | $V_3$ | $R_3$ | $\theta_3$ | $\Delta\theta_3$ | $\omega_3$ |
| $T_4$ | $P_4$ | $CP_4$ | $V_4$ | $R_4$ | $\theta_4$ | $\Delta\theta_4$ | $\omega_4$ |
| $T_n$ | $P_n$ | $CP_n$ | $V_n$ | $R_n$ | $\theta_n$ | $\Delta\theta_n$ | $\omega_n$ |

FIG. 5

ITEM NAVIGATION USING MOTION-CAPTURE DATA

BACKGROUND

A wide variety of user interfaces are used in computing systems to enable a user to move a cursor to a desired position in a list, in order to highlight a particular item for selection. Some lists, however, can be quite large, and may include hundreds, thousands or more items. Additionally, many lists regardless of size have a sequential arrangement of items that a user may wish to browse through sequentially. In some cases, the user will want to quickly pass through large numbers of items, for example to move to a location that is distant from the current cursor position. In other cases, it will be desirable to make fine and/or slow adjustments and only slightly move the cursor (e.g., sequentially browsing through a relatively small number of items once a general area has been reached, in order to select the particular item of interest).

Existing user interfaces are often very slow when called upon to cycle through many items in order to reach a distant item in a long list of items. This can lead to user impatience and dissatisfaction with the user interface. Alternatively, a different navigation operation can be performed, such as a navigating up to a higher-level category associated with the items (e.g., navigating up from a visual display of musical artists to a visual display of associated musical genres). The user could then move to select the appropriate category, and then navigate back "down" in order to reach a local area containing the desired item. However, this hierarchical approach entails different and extra steps, which may make the browsing and selection process more cumbersome. The hierarchical approach also prevents the user from directly paging through the individual items between the current and target location, which may in some instances be desirable to the user. The above challenges of providing effective navigation of items can be even more pronounced in a natural user interface environment, such as a computing setting without a keyboard or mouse, in which a host of issues can arise with respect to interpreting user gestures.

SUMMARY

Accordingly, the disclosure provides a system and method of using motion-capture data to control a computing system. The method includes obtaining a plurality of positions for an object from motion-capture model data, with the positions being representative of a user's movement of the object in a three-dimensional motion-capture space. The method determines a curved-gesture center point based on at least some of the plurality of positions for the object. Using the curved-gesture center point as an origin, an angular property is determined for one of the plurality of positions for the object. The method further includes navigating a cursor in a sequential arrangement of selectable items of a user interface based on the angular property.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 depicts an additional example of a user interface having a cursor that may be controlled using motion-capture data from a curved gesture.

FIG. 3 provides a visual representation of motion-capture data associated with an exemplary curved gesture.

FIG. 4 provides a visual representation of an object's position, as obtained from motion-capture data, and illustrates related parameters that may be associated with the position and used to control navigation of a cursor, such as the cursor shown in FIGS. 1 and 2.

FIG. 5 shows an exemplary history of object positions obtained from motion-capture data, along with related parameters that may be associated with each of the object positions and used to control navigation of a cursor in a user interface.

DETAILED DESCRIPTION

Figure 1:
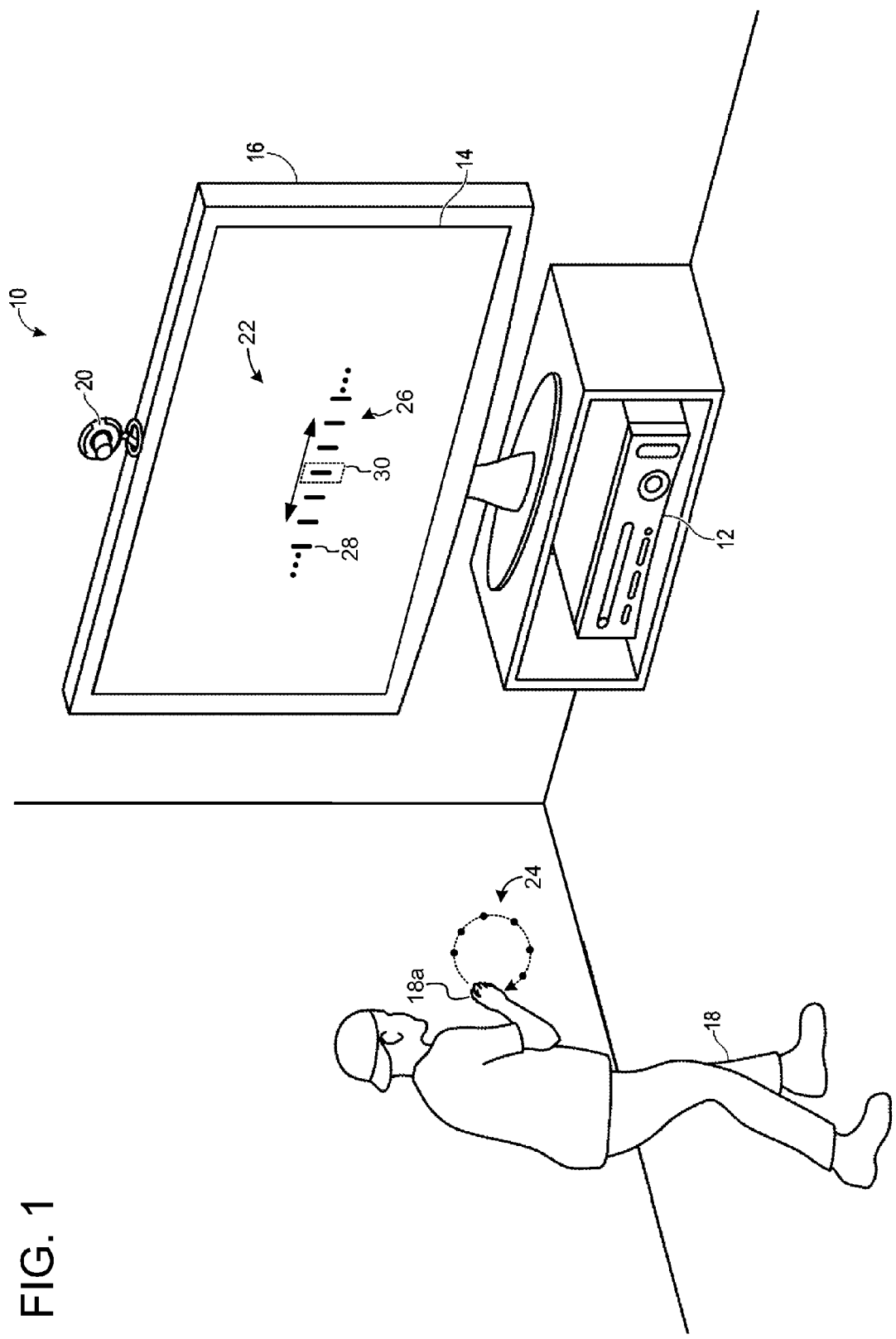
FIG. 1 shows an exemplary computing scenario in which motion-capture data from a curved gesture can be used to control a cursor of a user interface.

FIG. 1 shows a non-limiting example of a computing system 10 in which motion-capture model data can be used to control a user interface executed by the computing system. In particular, computing system 10 includes a computing device 12 (e.g., a video game console) that may be used to play a variety of different games, play one or more different media types, and/or control or manipulate non-game applications. FIG. 1 also shows a display 14 in the form of a high-definition television, or HDTV 16, which may be used to present visual information to users, such as user 18. Furthermore, FIG. 1 shows a capture device in the form of a depth camera 20, which may be used to visually monitor one or more users, such as user 18.

A capture device and supporting hardware/software may be used to recognize, analyze, and/or track one or more objects, such as user 18. Object movements may be interpreted as operating system and/or application controls. Virtually any controllable aspect of an operating system and/or application may be controlled by movements of a target, such as user 18.

FIG. 1 shows a scenario in which user 18 is tracked using depth camera 20 so that movements of user 18 may be interpreted to produce control over a user interface being executed by computing system 10, such as user interface 22 displayed on HDTV 16. Through operation of depth camera 20 and supporting hardware/software, motion-capture model data is generated for the user. The motion-capture model data is a computer-readable representation of the user's body and movements made by the user over time. In the present example, movement 24 of the hand 18a of user 18 is represented within the motion-capture model data as a number of positions in three-dimensional space occurring over time. As will be explained in detail below, a history of positions obtained from the motion-capture model data for an object may be used to control user interface 22. Many of the examples herein will be discussed in the context of hand positions and hand/arm movements, though it will be appreciated that any appropriate object may be employed.

In the example scenario of FIG. 1, user interface 22 includes a sequential arrangement 26 of items 28 (only one of the items is designated in the figure). An individual item 28 may be highlighted for selection through movement of cursor 30 to change its position forward and backward through the items 28. In some settings, sequential arrangement 26 can be quite long, and may include hundreds, thousands or more items 28. Accordingly, user 18 at times will want to move cursor 30 through or past a large number of items 28, while at the same time being able to exert finer levels of control over cursor movement to make smaller movements through the items and ultimately cause a specific item 28 to be highlighted for selection.

It will be appreciated that "cursor" refers herein to the selectable position in a list or other arrangement of selectable items. Accordingly, references to moving or navigating the cursor in or through items can also mean having a selectable position that is stationary on a display screen, while the items move past the stationary selectable position. For example, in FIG. 1, sequential arrangement 26 may move leftward and rightward, with cursor 30 remaining in the center of the screen.

Continuing with FIG. 1, to move cursor 30 through items 28, user 18 may make curved gestures, such as circular movements (e.g., movement 24) of hand 18a. The resulting hand positions that are produced in the motion-capture model data are then interpreted to produce control signals that move cursor 30. Interpretation of the hand positions obtained from the motion-capture model may include determinations that assign characteristics to the hand motion, which may be expressed as parameter values that are associated with each hand position.

For example, the hand positions in the motion-capture data may be interpreted to infer a circular motion for hand 18a, even though the actual motion from moment to moment may be imperfect and vary in character (e.g., imperfect curves, arcs, circles and the like). In the interpreted data, the hand position(s) and inferred circular motion may be associated with various determined parameters, including a center point of rotation; a radius; a direction of rotation; an angular position for a hand position; a change in angular position; and/or an angular velocity, to name but a few non-limiting examples. One or more of these parameters may be used to control the way in which cursor 30 moves through items 28.

For example, the user may make a number of rapid circles in space with their hand in order to quickly navigate to a general area of interest in the list of items (e.g., a particular alphabetical location). Then, as the speed of hand rotation slows (e.g., decreased angular velocity), cursor movement may slow down as a result and allow for finer adjustment of the cursor position in the list. In this example, the user is enabled to perform both relatively larger and relatively smaller-scale navigations with a single type of gesture. The user does not have to navigate upward hierarchically or display a different type of interface in order to achieve positioning of the desired item.

FIG. 2 provides an additional example of a user interface 22 that may be controlled using the present systems and methods. In this case, the cursor 30 is implemented as a selector that moves back and forth to allow a user to select a desired location in an audio file, video clip or other media selection. The sequential arrangement 26 of selectable items 28 is the series of locations (e.g., times) within the media selection that may be selected by the user.

Assigning circular motion attributes to historical object positions (e.g., hand positions) may present various challenges. FIG. 3 depicts an example motion path 40 representing successive tracked positions of a hand during the making of a curved gesture. The example shows the potential for variation in the gesture, including changes in curvature, radius, center of rotation, etc. In addition, the user may move their hand at varying speeds. Also, a given user may make gestures that differ substantially in character, including conscious changes in a gesture to effect different types of control over the user interface, such as to more rapidly cycle through a list of displayed items. Curved gestures can also vary from user to user. Circular motions will often be irregular and vary in shape. The described systems and methods may be configured to allow a user to effect the desired control over cursor movement, while at the same time allowing the user to make circular gestures in whatever way that they wish.

Referring now to FIGS. 4 and 5, a motion-capture model stored in a computing system may provide a history of positions for a tracked object that may be used to interpret an associated curved gesture, such as movement 24 of hand 18a in FIG. 1. FIG. 5 shows an exemplary history 100, including a plurality of positions for an object, denoted $P_1$ through $P_n$. These positions may be obtained from a motion-capture model, and may be described in terms of rectilinear coordinates or other suitable descriptions. As indicated, various other parameters may be associated with and/or generated for each of the positions $P_1$ through $P_n$. For example, history 100 may include one or more of the following for each position: (1) time T; (2) center point CP; (3) vector V; (4) radius R; (5) angle $\theta$; (6) change in angle $\Delta\theta$; and (7) angular velocity $\omega$. These parameters will be described in detail below. The subscripts in history 100 denote the association of a parameter value with a particular position obtained from the motion-capture model. In other words, associated with position $P_1$ are time $T_1$, center point $CP_1$, vector $V_1$, radius $R_1$, angle $\theta_1$, change in angle $\Delta\theta_1$, and angular velocity $\omega_1$.

FIG. 4 provides a graphical illustration of the various parameters that may be included in and/or generated for history 100 in connection with the positions obtained from the motion-capture model. As previously discussed, position P is a description of the location in three-dimensional space of the hand or other object of interest. The motion-capture model typically will also include a time T associated with that position. Time information may be expressed in various ways, including direct methods (such as with a timestamp), or indirectly through associating a given position with a particular frame in a series of motion-capture frames.

A center point CP may be calculated for some or all of the positions P in history 100. For a given object position, the calculated center point is an approximation of the location about which the hand or other object is rotating to make the curved gesture. Because it is associated with such a gesture, the calculated center point will therefore at times be referred to as a "curved-gesture center point." The generation of the center point CP may provide the basis for determining several of the other parameters, and a method of determining the center point will be set forth in more detail below. Once a center point CP is established for a position P, it may be desirable to employ vector and radius descriptions to characterize the relationship between the position and its associated center point. In the example of FIG. 4, vector V is a vector extending from center point CP to position P. Radius R is the distance between the position P and the calculated center point CP.

Angle $\theta$ is a description of the angular position of position P, defined as the angle between vector V and a reference line or vector 102. Any appropriate reference may be employed to define angular position. In some cases, it will be convenient to select a horizontal reference (i.e., a line in the xz plane of FIG. 4).

The change in angle Δθ may be calculated based on one or more of the prior entries in history 100 (FIG. 5). In one example, the change in angle (change in angular position) is simply derived by comparing the current angular position to that of the previous entry in the history. For example, for position $P_4$ in history 100, $\Delta\theta_4$ may simply be calculated as the result of $\theta_4-\theta_3$. Alternatively, approaches may be employed involving weighting, smoothing, averaging, etc., in connection with one or more values from prior object position entries in history 100. Furthermore, the Δθ may be expressed in terms of angular velocities, as shown in FIG. 5, through use of the time information ($T_1$ through $T_n$ in FIG. 5) obtained from the motion-capture model. Changes in angular positions and/or angular velocities may be expressed as magnitudes (absolute value) or as signed values to indicate rotation direction. Signed values will often be appropriate, as many exemplary embodiments will involve controls to navigate a cursor both forward and backward through a list of items.

Figure 6:
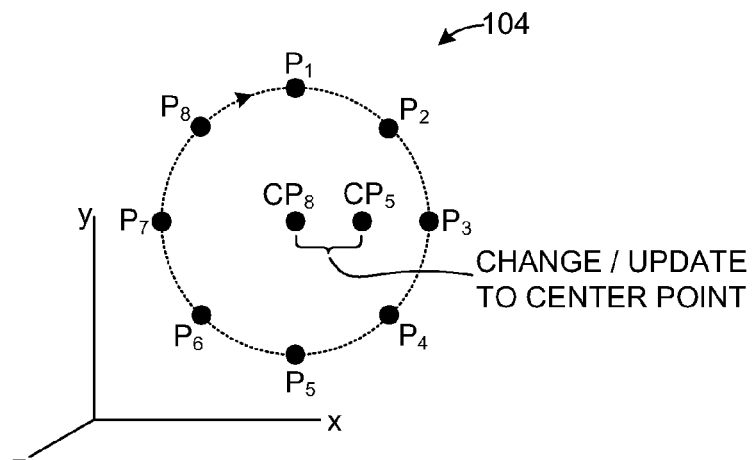
FIG. 6 illustrates determination and updating of a center point based on object positions obtained from motion-capture data.

FIG. 6 provides a schematic depiction 104 of an exemplary method of determining a curved-gesture center point. From a motion-capture model, a plurality of object positions $P_1$ through $P_8$ have been obtained, which are reflective of an object moving in clockwise direction in space. Center point $CP_5$ is the center point that is associated with position $P_5$. In the present example, the center point calculation is obtained by calculating an average position. The average may be calculated with respect to the current position and any number of other positions that are in the position history obtained from the motion-capture model. In the present example, center point $CP_5$ is associated with position $P_5$ and is the average of positions $P_1$ through $P_5$.

When average positions are used to determine a center point, weighting may be employed. For example, more recent object positions obtained from the motion-capture model may have a greater effect on the location of the calculated center point than older object positions in the history. It should be understood that the preceding description is but one non-limiting example of calculating a center point and many other alternatives are possible without departing from the scope of this disclosure.

Continuing with FIG. 6, assuming a current object position $P_5$ and a calculated center point $CP_5$, the various other parameters may be determined as described above. Moreover, center point $CP_5$ may be used as the reference center point when calculating the various angle parameters discussed above. For example, a change in angular position associated with position $P_5$ may be determined by comparing a vector extending from center point $CP_5$ to position $P_5$ with a vector extending from center point $CP_5$ to one of the previous positions in the history, such as $P_4$, $P_3$, etc. Time information may further be used to associate an angular velocity with position $P_5$.

FIG. 6 also shows the ability in the present systems and methods to have the center point change over time. Specifically, center point $CP_8$ is associated with position $P_8$, and is generated as an average of positions $P_1$ through $P_8$. Thus, over the time differential between position $P_5$ and position $P_8$, the center point may shift from $CP_5$ to $CP_8$. During updating of the center point, it may be desirable in some cases to employ smoothing, to avoid large discontinuities in center point position.

The ability to update and change the center point can provide various benefits. With a rigid or fixed center point, it may be difficult for the user to see or feel how well they are rotating around the center point as they are making the gesture. For example, the user may loop too close to the center, or cut inside the center, which would yield errors or unexpected results in interpreting the gesture and producing the corresponding cursor control if the center point was not adjustable. The variable center point also allows for effective gesture interpretation while allowing the user to make curved-gestures that vary in character and that are comfortable and appropriate for their body type, range of motion, etc.

Referring again to FIG. 5, history 100 of hand positions and associated parameters may be used in nearly limitless ways to control cursor movement through a list of items. In the context of curved hand gestures, where the user attempts a "dialing" or "cranking" motion with their hand and arm in three-dimensional capture space, the characteristics of the motion can produce different control over a cursor in a user interface, such as the cursor 30 shown in FIGS. 1 and 2.

In many examples, the curved-gesture center point may be used as an origin for determining an angular property. The angular property, in turn, may be used to control navigation of the cursor, such as its placement in a list, the rate at which it moves through a list, the number of items that are traversed, etc.

For example, the angular property may be an angle or angular position determined with respect to a reference, such as angle θ in FIG. 4. This angle can then be directly mapped to a particular location in a navigable list of items, such as that shown in FIGS. 1 and 2. For example, calculating 45 degrees as the angle for a particular hand position during a rotating gesture could correspond to placing the cursor in the particular location, such as at the nth item in a list of 1000 items.

In another example, changes in angular position may be used to determine the angular property used to control cursor movement. A scaling may be employed, in which the cursor traverses a number of items in proportion to the size of the change in angular position. More concretely, a full circle of the hand (360 degrees) might correspond to navigating through 200 or any other suitable number of selectable items. Any appropriate scaling value may be employed, and the value may depend on the number of items in the list to be navigated, among other factors. Such scaling may depend additionally on other parameters. For example, finer or larger adjustments to cursor position may be made in response to the radius values in history 100 (i.e., as derived from the current positions and associated center points). For example, it might be desirable that rotation through a given angle causes cursor movement through a larger number of items for a larger radius. In addition, radius measurements may be used in connection with measurement of the user's arm length to derive a ratio that can be used in conjunction with other parameters to control cursor speed.

In still another example, the angular velocities of FIG. 5 may be used to determine the angular property used to control cursor navigation. For example, a speed of a hand rotation (as represented by the determined angular velocity in history 100) may control the rate at which the cursor moves through the selectable items. Furthermore, the speed of navigation through the list may be based upon a history of angular velocities. For example, sustaining a particular angular velocity (e.g., for a threshold amount of time) may be used to create a momentum effect, in which cursor movement is further increased to aid in traversing large distances through a list.

Figure 7:
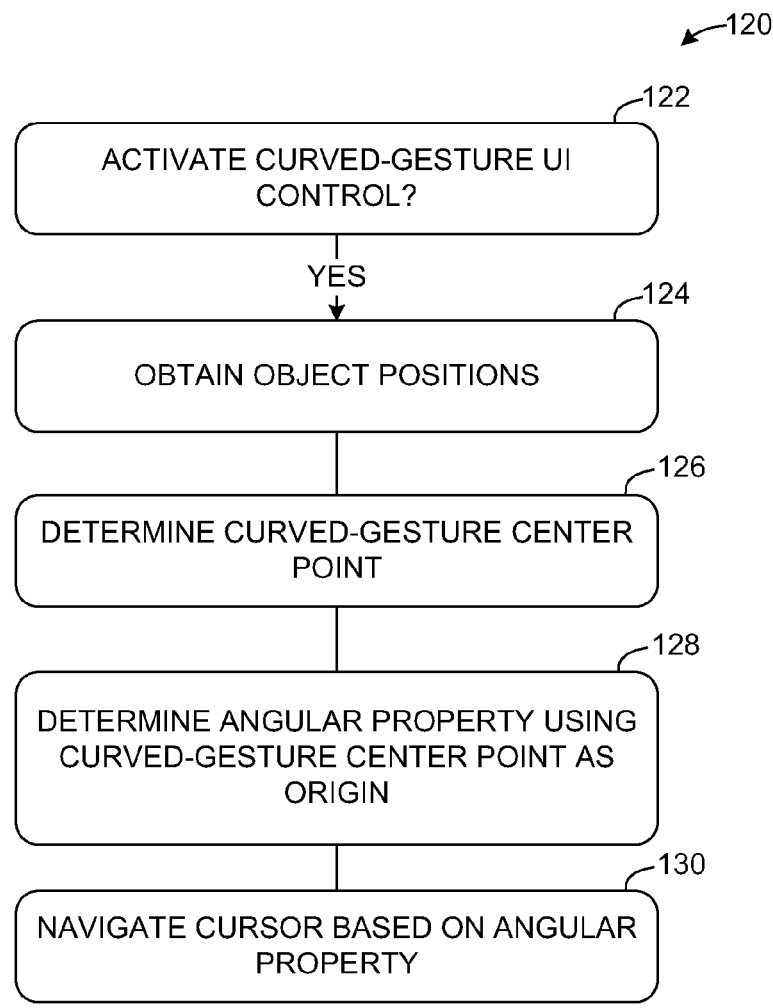
FIG. 7 depicts an exemplary method of using object positions to determine angular properties for controlling navigation of a cursor through a sequential arrangement of items in a user interface.

It should be understood that the present disclosure also encompasses a method of controlling a computing system using motion-capture data. FIG. 7 depicts an example of such a method 120, in which movement of an object is represented as a plurality of positions in motion-capture model data, with those positions being interpreted to control movement of a cursor through a sequential arrangement of items.

At 122, the method may first include determining whether curved-gesture UI control is to be activated. Motion capture may be used for a variety of other purposes in connection with controlling a computer, and thus it may be desirable to employ a procedure to specifically initiate the functionality for controlling cursor movement based on curved gestures, such as the dialing hand gesture described above. Having a delineated mode and operational context for curved-gesture control may in some cases simplify interpretation of motion-capture data. In one example, curved-gesture UI control is initiated via audio, such as detection of a vocal command or other sound produced by the user. In another example, visual cues may be provided on a display screen (e.g., display 14) to prompt the user to move their hand to a particular location or in a particular way to activate the curved-gesture control. In still another example, a specific gesture may be used to enter and engage the curved-gesture UI control.

At 124, the method includes obtaining a plurality of positions for an object. As discussed above, the positions of the object may be obtained from motion-capture data and are representative of the object moving in three-dimensional space, such as a user's hand making a curved-gesture.

At 126, the method includes determining a curved-gesture center point based on at least some of the object positions obtained at 124. In some examples, as discussed with reference to FIG. 6, the center point may be established by determining an average position using some or all of the object positions obtained at 124.

At 128, the method includes determining an angular property using the curved-gesture center point as an origin. As in the example of FIG. 5, the angular property may include angle (angular position), change in angular position, and/or angular velocity. Finally, at 130, the method may include navigating a cursor in a sequential arrangement of items based on the angular property determined at 128. Similar to the previously-described examples, method 120 may include updating the curved-gesture center point from time to time. In some cases, a new center point may be calculated for each of the positions obtained at 124, and angular properties for the object positions may be calculated accordingly. In other examples, the center point may be updated less frequently, and/or smoothing may be employed to avoid discontinuities.

Disengagement from the curved-gesture control described herein may occur in various ways. In one approach, once a desired item has been reached via cursor positioning, maintaining the cursor position for a period of time causes the item to be selected and thus disengages the curved-gesture control. In another example, a specific arm gesture may be used, such as thrusting the user's arm toward the display screen 14 in FIG. 1 (e.g., a z-axis movement). In yet another example, audio prompts may be employed to select an item and thus disengage the curved-gesture control. Also, in the absence of selecting an item, rules and/or boundary conditions may be employed to infer disengagement. For example, disengagement may occur if the user drops their arm to their side or toward the ground.

Figure 8:
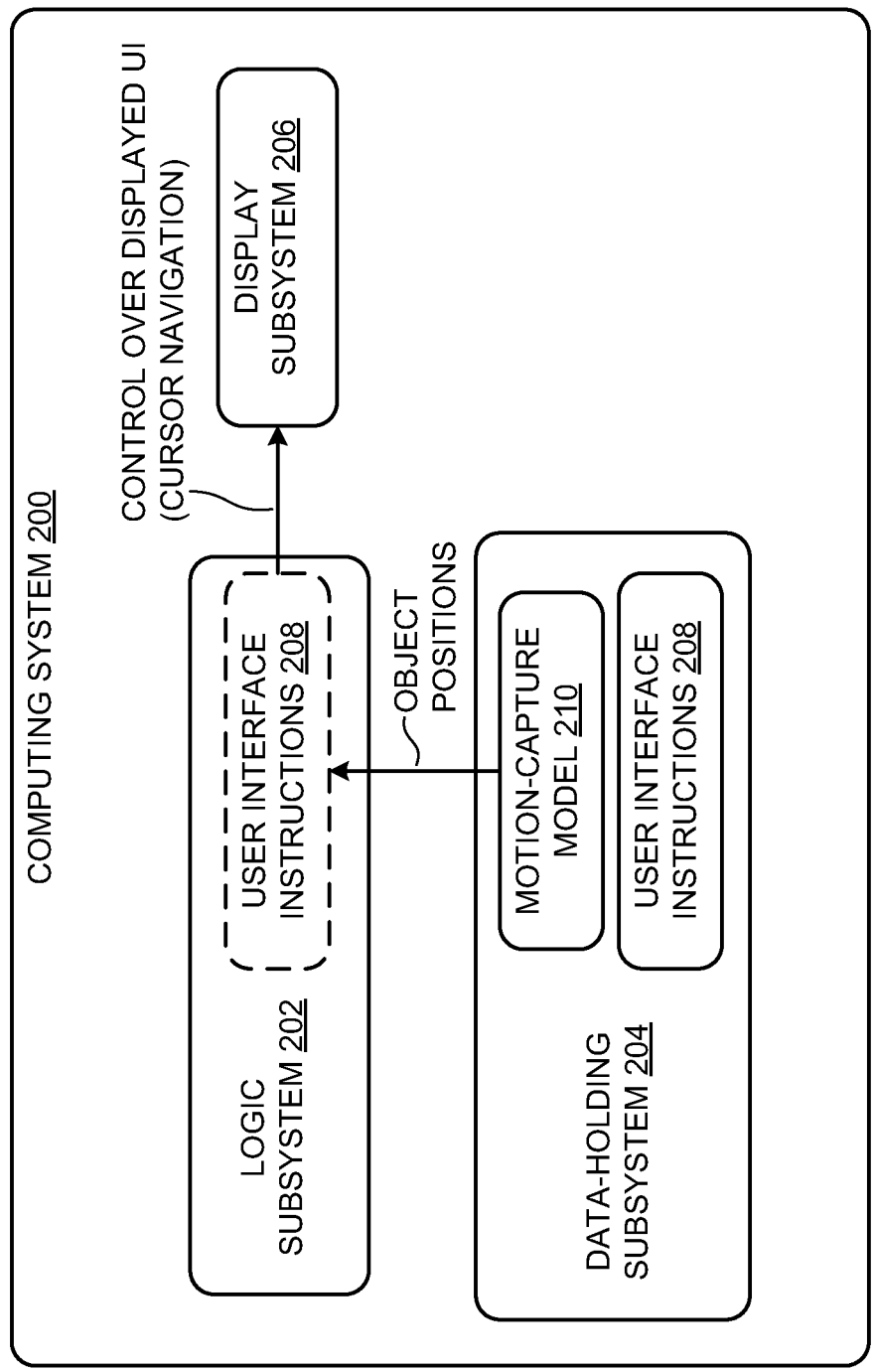
FIG. 8 shows an exemplary computing system in accordance with embodiments of the present disclosure.

As described with reference to FIG. 1, the above described methods and processes may be tied to a computing system. FIG. 8 provides an additional example of a computing system 200 that may perform one or more of the above described methods and processes. Computing system 200 includes a logic subsystem 202, a data-holding subsystem 204 and a display subsystem 206. Computing system 200 may optionally include other components not shown in FIG. 8, such as a motion-capture subsystem, to name but one example.

Logic subsystem 202 may include one or more physical devices configured to execute one or more instructions. In particular, logic subsystem 202 is shown executing a copy of user interface instructions 208, which are contained on data-holding subsystem 204. As indicated in the figure and described in connection with the previous examples, object positions may be obtained from motion-capture model data 210 stored on data-holding subsystem and provided to the user interface instructions for processing. Processing may occur as previously described, in order to exert control over a user interface displayed on display subsystem 206. In particular, the object positions obtained from the model may be interpreted to control navigation of a cursor on a screen of display subsystem 206.

Continuing more generally with logic subsystem 202, it may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 204 may include one or more devices configured to hold data and/or instructions executable by the logic subsystem to implement the herein described methods and processes. When such methods and processes are implemented, the state of data-holding subsystem 204 may be transformed (e.g., to hold different data). Data-holding subsystem 204 may include removable media and/or built-in devices. Data-holding subsystem 204 may include optical memory devices, semiconductor memory devices, and/or magnetic memory devices, among others. Data-holding subsystem 204 may include devices with one or more of the following characteristics: volatile, nonvolatile, dynamic, static, read/write, read-only, random access, sequential access, location addressable, file addressable, and content addressable. In some embodiments, logic subsystem 202 and data-holding subsystem 204 may be integrated into one or more common devices, such as an application specific integrated circuit or a system on a chip.

Display subsystem 206 may be used to present a visual representation of data held by data-holding subsystem 204. As the herein described methods and processes change the data held by the data-holding subsystem, and thus transform the state of the data-holding subsystem, the state of display subsystem 206 may likewise be transformed to visually represent changes in the underlying data. Display subsystem 206 may include one or more display devices utilizing virtually any type of technology. Such display devices may be combined with logic subsystem 202 and/or data-holding subsystem 204 in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of using motion capture to control a computing system, the method comprising:
    obtaining, from motion-capture model data, a plurality of positions for an object, said plurality of positions being representative of a user's movement of the object in a three-dimensional motion-capture space;
    determining a curved-gesture center point based on at least some of the plurality of positions for the object;
    using the curved-gesture center point as an origin, determining an angular property for one of the plurality of positions for the object; and
    in a user interface, navigating a cursor in a sequential arrangement of selectable items based on the angular property.

2. The method of claim 1, wherein the curved-gesture center point is determined by determining an average position using the plurality of positions.

3. The method of claim 1, wherein the angular property is an angle defined between a reference line and a line extending between the curved-gesture center point and said one of the plurality of positions for the object, and wherein navigating the cursor includes positioning the cursor in a location in the sequential arrangement of selectable items that corresponds to the angle.

4. The method of claim 1, wherein the angular property is a change in angular position, and wherein navigating the cursor includes causing the cursor to traverse a number of the selectable items that is in proportion to the change in angular position.

5. The method of claim 4, wherein the number of selectable items that are traversed is further in proportion to a radius between the curved-gesture center point and said one of the plurality of positions for the object.

6. The method of claim 1, wherein the angular property is an angular velocity, and wherein navigating the cursor includes causing the cursor to move through the selectable items at a rate that is in proportion to the angular velocity.

7. The method of claim 1, wherein the object is a user's hand.

8. The method of claim 1, further comprising:
    updating the curved-gesture center point;
    using such updated curved-gesture center point, determining an angular property for a second one of the plurality of positions for the object; and
    in the user interface, navigating the cursor in the sequential arrangement of selectable items based on the angular property for the second one of the plurality of positions for the object.

9. The method of claim 1, wherein the selectable items are locations within a media selection.

10. A computing system having a user interface that is controllable through motion capture, comprising:
    a logic subsystem;
    a display subsystem operatively coupled with the logic subsystem and configured to display a user interface having a sequential arrangement of selectable items;
    a data-holding subsystem operatively coupled with the logic subsystem and containing motion-capture model data, the data-holding subsystem also containing user interface instructions executable by the logic subsystem to:
        obtain, from the motion-capture model data, a plurality of positions for an object, said plurality of positions being representative of a user's movement of the object in a three-dimensional motion-capture space;
        determine a curved-gesture center point based on at least some of the plurality of positions for the object;
        using the curved-gesture center point as an origin, determine an angular property for one of the plurality of positions for the object; and
        navigate a cursor in the sequential arrangement of selectable items based on the angular property.

11. The computing system of claim 10, wherein the user interface instructions are configured to determine the curved-gesture center point by determining an average position for the plurality of positions.

12. The computing system of claim 10, wherein the angular property is an angle defined between a reference line and a line extending between the curved-gesture center point and said one of the plurality of positions for the object, and wherein the user interface instructions are configured to position the cursor in a location in the sequential arrangement of selectable items that corresponds to the angle.

13. The computing system of claim 10, wherein the angular property is a change in angular position, and wherein the user interface instructions are configured to cause the cursor to traverse a number of the selectable items that is in proportion to the change in angular position.

14. The computing system of claim 10, wherein the angular property is an angular velocity, and wherein the user interface instructions are configured to cause the cursor to move through the selectable items at a rate that is in proportion to the angular velocity.

15. The computing system of claim 10, wherein the object is a user's hand.

16. The computing system of claim 10, wherein the user interface instructions are further configured to:
    update the curved-gesture center point;
    use such updated curved-gesture center point to determine an angular property for a second one of the plurality of positions for the object; and
    navigate the cursor in the cursor in the sequential arrangement of selectable items based on the angular property for the second one of the plurality of positions for the object.

17. The computing system of claim 10, wherein the selectable items are locations within a media selection.

18. A method of using motion capture to control a computing system, the method comprising:
    obtaining, from motion-capture model data, a plurality of positions for a hand of a user, said plurality of positions being representative of the user's hand moving in a three-dimensional capture space;
    determining a first curved-gesture center point based on a first set of hand positions from the plurality of positions;
    determining a first angular property using the first curved-gesture center point as an origin;
    determining a second curved-gesture center point based on a second set of hand positions from the plurality of positions;
    determining a second angular property using the second curved-gesture center point as an origin; and
    changeably navigating a cursor in a sequential arrangement of selectable items, such that the cursor is first navigated based on the first angular property, and then subsequently navigated based on the second angular property.

19. The method of claim 18, wherein changeably navigating the cursor includes varying a rate at which the cursor is caused to move through the selectable items.

20. The method of claim 18, wherein the selectable items are locations within a media selection.

* * * * *

UNITED STATES PATENT AND TRADEMARK OFFICE
CERTIFICATE OF CORRECTION

PATENT NO. : 8,416,187 B2  
APPLICATION NO. : 12/820990  
DATED : April 9, 2013  
INVENTOR(S) : Margolis et al.

Page 1 of 1

It is certified that error appears in the above-identified patent and that said Letters Patent is hereby corrected as shown below:

On the Title Page

In page 3, in Item (56), under "Other Publications" column 2, line 24, delete "Caimbridge" and insert -- Cambridge --, therefor.

In page 3, in Item (56), under "Other Publications" column 2, line 30, delete "Caimbridge" and insert -- Cambridge --, therefor.

Signed and Sealed this  
Third Day of February, 2015

Michelle K. Lee  
*Deputy Director of the United States Patent and Trademark Office*